United States Patent [19]

Dudouyt

[11] 4,049,287
[45] Sept. 20, 1977

[54] SAIL VEHICLES

[76] Inventor: Jean-Paul Dudouyt, Villa Atogebea-Avenue des Oeillets, 40150 Hossegor, France

[21] Appl. No.: 674,240

[22] Filed: Apr. 6, 1976

[30] Foreign Application Priority Data

Apr. 14, 1975 France .................. 75.11531

[51] Int. Cl.² .......................................... B62B 15/00
[52] U.S. Cl. ...................... 280/213; 114/39; 114/43; 180/2 A
[58] Field of Search ............... 114/39, 43, 102; 280/213, 16, 21 R, 21 A; 180/2, 3 R

[56] References Cited

U.S. PATENT DOCUMENTS

| 2,238,464 | 4/1941 | Fletcher | 114/43 |
| 2,351,542 | 6/1944 | Paull | 114/43 |
| 3,395,664 | 8/1968 | Greenberg et al. | 114/39 |
| 3,572,740 | 3/1971 | Rypinski | 114/43 |
| 3,831,539 | 8/1974 | Black | 280/16 |

FOREIGN PATENT DOCUMENTS 1,175,929   4/1959   France ................. 280/213

Primary Examiner—Trygve M. Blix
Assistant Examiner—Stuart M. Goldstein
Attorney, Agent, or Firm—Edwin E. Greigg

[57] ABSTRACT

A wind-propelled sail vehicle comprises a perimeter frame, a mast and a chassis with three support members such as wheels, pads or skis. Two support members of fixed orientation are situated forward, the third support member, for steering, is situated aft and the mast is placed substantially vertically over the forward support members. The mast is positively mounted in the head of a rigid tripod and fixed with respect to the middle of the front cross-beam of the chassis. One foot of the tripod is mounted to the frame and the other feet to the lateral portions of the frame. The laterally mounted feet at their juncture with the frame form the axles upon which the wheels, pads or skis are mounted. This construction greatly increases manoeuvrability while reducing the overall weight of the apparatus for a given sail surface.

6 Claims, 3 Drawing Figures

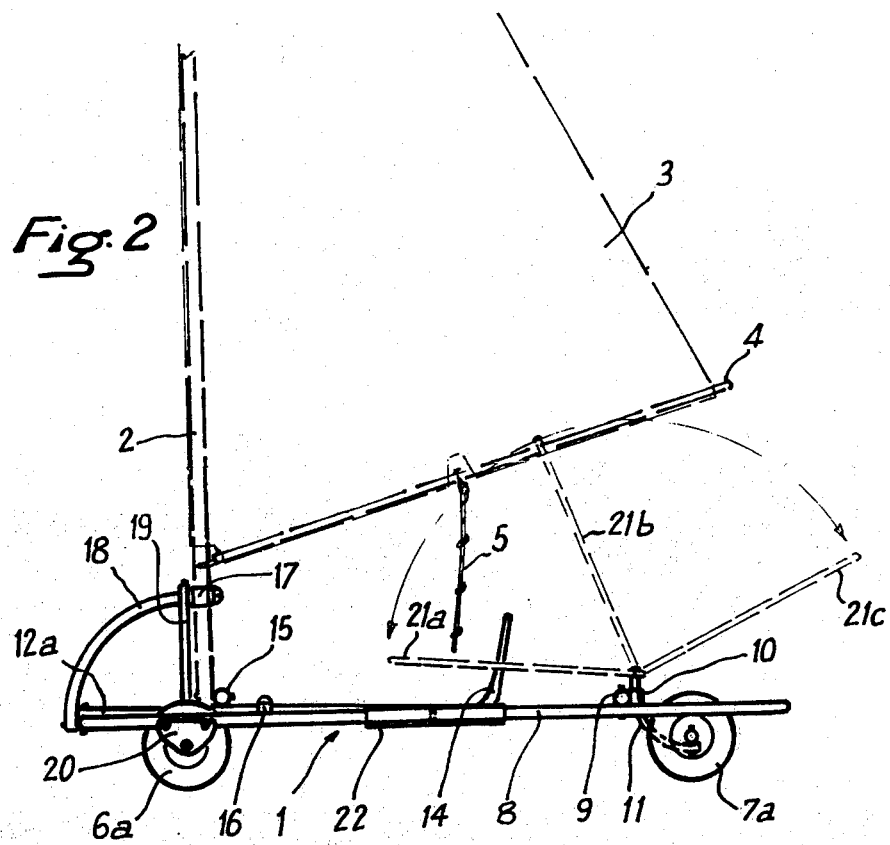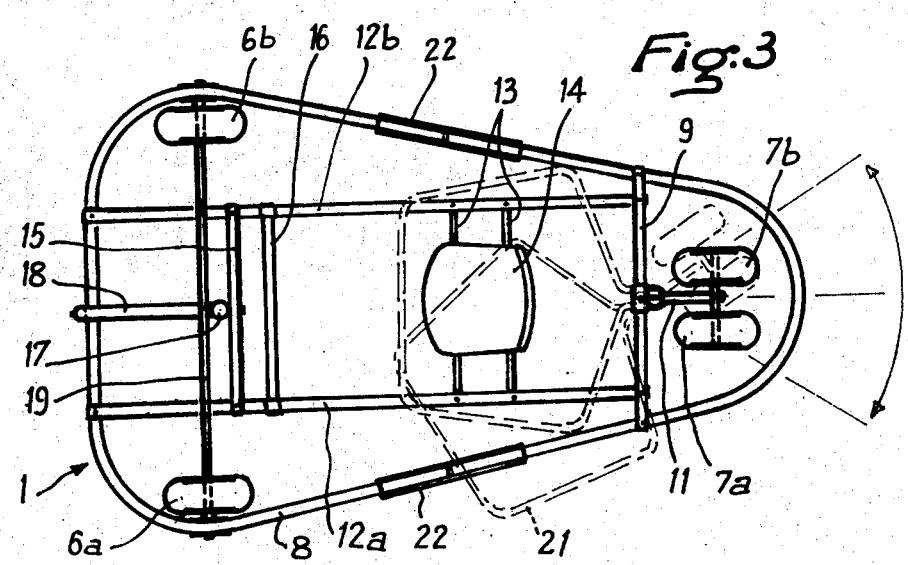

SAIL VEHICLES

BACKGROUND OF THE INVENTION

The present invention relates to the construction of the chassis of a sailing apparatus, and, more particularly to the construction of the steering system and the mode of attachment and of operation of the mast.

Sailing vehicles have existed since the earliest antiquity in Egypt, and then in China. In Europe, numerous types of vehicles with sails have been constructed, notably in the 16th, 17th, 18th and 19th centuries. However it was only at the beginning of the 20th century that the first competitions were organised. From the time when the use of sail vehicles, regulated for parades was codified for competitions, rigorously controlled championships have been organised. In France, there exists a National Federation of Sail Vehicles attached to the International Federation of Sand and Land Yachting. The various types of sail vehicles offered by constructors have been classed in three categories according to their sail surfaces: class 3 up to 6.50 $m^2$ of sail, class 2 up to 10 $m^2$ and class 1 up to 15 $m^2$. Of course, the greater the sail surface, the greater are the forces transmitted by the mast and the stronger and hence the heavier must be the chassis. Sail vehicles of class 1 weigh between 350 and 500 kg, those of class 2 have a weight which varies from 150 to 350 kg and the lightest of class 3 weigh about 100 kg.

Certain known sail vehicles are provided with a frame of rectangular configuration and two axles each axle having two wheels, one of the axles being steerable. Other vehicles have four wheels arranged in a diamond-shaped configuration, the isolated wheels being for steering, but the majority comprise three wheels, two rear lateral wheels and one front steering wheel distinctly ahead of the mast.

Devices with four wheels arranged in the conventional manner result in poor manoeuvrability. With the majority of three wheeled sail vehicles, in which two wheels are at the rear, the pilot's seat is substantially at the level of the latter and the mast is borne forward of said rear wheels, that is to say at a point where the chassis is reduced to the "dorsal fin" which is extended up to the front wheel. This arrangement, even for a vehicle with a small sail surface, necessitates bracing of the mast, which results in considerable time for assembly and disassembly.

In known sail vehicles bracing is effected by means of three cables, two connected to the axle close to each of the rear wheels and one to the chassis, fairly close to the steering wheel. This arrangement presents a major drawback. The thrust of the wind, which is never exactly along the axis of the vehicle, acts on one wheel through the tension of the corresponding shroud while the other shroud becomes slack. The "pulled" wheel is lifted above the ground and the sail vehicle tends to tip over. To reduce the risk of the apparatus completely capsizing at this moment, the designers have been led to increase the length of the axle considerably but this does not prevent the pilot from "falling back" from an appreciable height while the wheel is recovering its contact with the ground.

In addition, the weight of the pilot acting substantially at the middle of the rear axle, that is to say at the middle of the base of the supporting triangle, it is necessary for the chassis itself to have sufficient weight to ensure stability, but that same weight is a serious handicap for the handling and transportation of sail vehicles which, by and large, can only be moved on a trailer.

Finally, the very wide track of the rear wheels with respect to the chassis required for lateral vehicular stability and control, which is essential in the general construction of the types of sail vehicles known previously, prevents any external protection of the wheels against accidental impacts, and considerably increases the risk of collision when several vehicles follow parallel paths.

OBJECTS AND GENERAL DESCRIPTION OF THE INVENTION

It is an object of the invention to provide a sail vehicle which avoids the aforementioned drawbacks. It is another object of the invention to provide a sail vehicle having a construction such that the thrust of the wind is transmitted rigidly to the wheels.

It is also an object to provide a sail vehicle wherein the weight of the pilot acts distinctly within the supporting triangle and in which all the wheels are located within the frame.

It is a further object to provide alternate means for support of the vehicle chassis for over varying surfaces, such as ice, snow or water.

Other objects and advantages of the sail vehicle according to the invention will become apparent from the description which follows.

According to the invention there is provided a sail vehicle having two support members of fixed orientation situated forward, a third support member for steering situated astern, and a mast mounted substantially vertical to the forward support members positively in the head of a rigid tripod, one of whose feet is fixed to the middle of the forward cross piece of the chassis, the other feet to the frame in the vicinity of the wheels.

BRIEF DESCRIPTION OF THE DRAWINGS

The invention will be better understood on reading the description which follows of one embodiment of a sail vehicle according to the invention and on studying the accompanying drawings, given purely by way of non-limiting illustration, in which:

FIG. 2 is a view in elevation of the embodiment shown in FIG. 1; and

FIG. 3 is a plan view of said embodiment, the mast being removed.

DESCRIPTION OF THE PREFERRED EMBODIMENT

Figure 1:
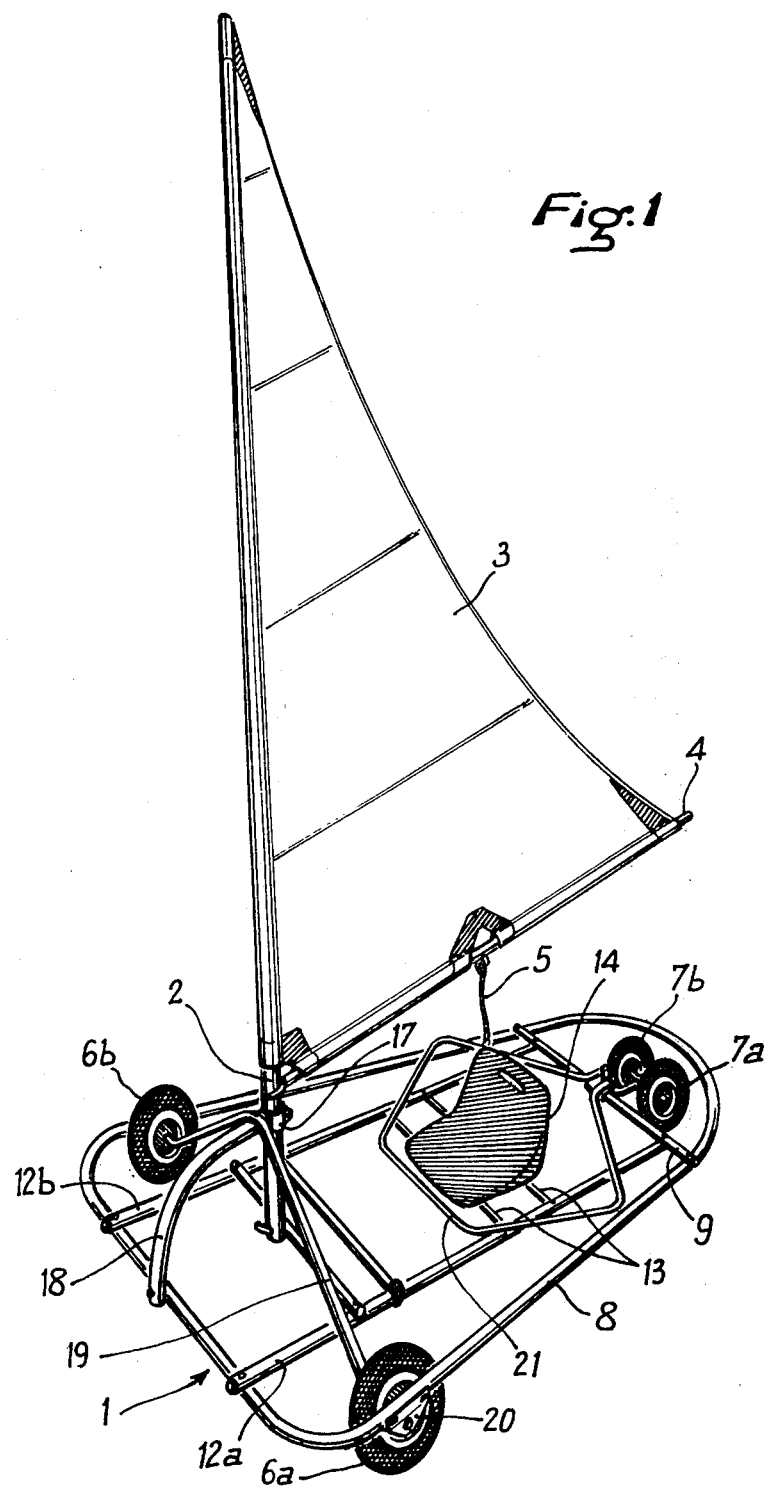
FIG. 1 is a perspective view of an embodiment of a sail vehicle according to the invention.

The embodiment shown in the drawings comprises a chassis or frame 1, a mast 2 and a sail 3.

In FIG. 1 the sail is fitted on a mast (which if necesary is telescopic for ease of transportation) and a boom of conventional type, to which the sail is attached, is hinged on the mast at a point situated sufficiently high for the boom to pass above the head of the pilot. A control halyard 5 is located substantially at the middle of the boom. Preferably the halyard is knotted at intervals to provide a better grip.

The chassis includes three support members. FIG. 1 shows a rolling vehicle whose support members are four wheels equipped with low pressure pneumatic tyres. Two wheels 6a and 6b fixed positively to the frame are located forward, while the steering means located aft is provided with twin wheels 7a, 7b.

As best shown in FIG. 3 the chassis is in the form of a tubular perimeter frame 8 having a generally triangular configuration with rounded apices and the wheels mounted within the frame, which then acts as a fender. Towards the rear a cross-member 9 is supported to the frame on which it is bolted. It carries rigidly a vertical bushing 10, provided internally with a needle or roller bearing, or simply a friction ring, connected to a quadrant-shaped support bar 11 which carries the axle of the twin wheels 7a and 7b, which wheels are movable through an arc but whose lateral travel is bounded by the cross-member 9 and the rounded rear apex of the frame 8.

The chassis includes two longerons 12a and 12b mounted on the frame. The longerons are bolted to the front of the frame and, at the opposite end, beneath the cross-member 9. The longerons are cross-braced medially by two cross-bars 13 on which a seat is mounted, which can be either a conventional bucket seat 14 of synthetic material, or a fabric seat (not shown) stretched between the two cross-bars 13 with preferably an adjustable back. This arrangement enables great comfort to be obtained. The longerons held on the frame solely by their two ends have good flexibility and any bending tends to twist the cross-member 9 in the same direction as the torque transmitted to this cross-member by the support bar 11. Thus the cross member 9 acts as a true torsion bar producing a very satisfactory suspension.

Towards the front of the longerons are provided two tie bars 15 and 16. The tie bar 15 is supported on the top of the longerons 12a and 12b and is positioned slightly rearward of the axis of the wheels 6a and 6b. The tie bar 16 is mounted to the rear of the tie bar 15, at a slightly lower level than that of tie bar 15. Thus, the tie bar 15 serves as a foot rest for the pilot and the tie bar 16 constitutes a support for the back of his ankles. This arrangement prevents any accidental sliding of the pilot's feet on the bar 15.

As best shown in FIG. 1, the foot of the mast 2 is bolted or keyed against the front wall of the tie bar 15 and the mast is held in substantially vertical position by a sleeve 17, possibly a split sleeve enclosed by two clamping lugs. The sleeve 17 constitutes the head of a rigid tripod. One of the feet 18 of the latter extends forward on the longitudinal axis of the vehicle and is fixed by bolting to the front cross-beam of the frame 8; in FIG. 2 it is shown as substantially a quarter circle. The two other feet are extended in the same plane transverse to that axis, formed by an inverted V-shaped tube 19 whose extremities constitute the front axle, the two ends being bent to the horizontal to receive the wheel axles. Chassis mounting is done by triangular plates 20 borne by the frame 8 by bolts which are screwed to the internal threading of the wheel axles. This rigid connection of the mast, chassis and frame transmits the thrust of the wind to the corresponding wheel.

The steering member is composed of an extension handle of the support bar 11 and operates like the rudder of a boat. Preferably, this lever can take the form of a frame 21 surrounding the body of the pilot and can be hinged to the support bar 11 so as to be pivotable about a horizontal axis, pivotable rearwardly to facilitate access to the seat and, in addition, to serve as a convenient handle for moving the vehicle by hand. In FIG. 3, the frame 21 is shown in dashed lines in two steering positions; and in FIG. 2, it is shown in dashed lines in an operating position 21a, a position 21b which enables the pilot to take up his position in the seat and a position 21c which permits manual towing of the apparatus.

The advantages of this novel construction are numerous. The stability obtained by placing the pilot distinctly within the supporting triangle enables the weight of the vehicle to be considerably reduced. Thus with a mast of 4.50 m for a sail of 5 m², the use of aluminum tubing enables a total weight of less than 30 kg to be achieved. For a larger sail, there must be, of course, a higher mast and a larger wheel base (the wheel base must be substantially equal to one-third of the height of the mast); the weight will be increased and will be of the order of 50 kg for a sail surface of 10 m². Of course, the height of the tripod depends upon the height of the mast.

Manoeuvrability is extraordinary; for a sail surface of 5 m² (wheel base of 1.50 m, length 2.50 m) the steering radius is about 3 m.

The mounting of the mast and of the sail is effected in less than 3 minutes.

A trailer is unnecessary as the vehicle's light weight renders it easily transportable on a simple automobile roof rack.

Finally and above all, this apparatus can be maneuvered very much like a sail boat. When the seat 14 is replaced, as has been stated above, by a fabric stretched over the cross-bars 13, the sail vehicle enables steering in return position (the steering member then being a simple lever) and to shift over.

Of course, modifications can be made in the assembly without departing from the scope of the invention. Thus several positions can be provided for fixing the cross-bars 13 on the longerons 12a and 12b so as to make the longitudinal position of the seat adjustable. Alternately, the forward axle can be conventional and in this case the tube 19 is fixed rigidly to said axle in the vicinity of its ends. To reduce the bulk of the disassembled apparatus, the frame 8 can be comprised of two parts assembleable end to end by sleeves, such as those marked 22 in FIGS. 2 and 3. Lastly, as has been mentioned, the wheels may be replaced by runners or by skis according to the nature of the terrain on which the land vehicle is to operate or even by floats.

I claim:

1. A wind propelled sail vehicle comprising a frame, said frame arranged to support therewithin a pair of rotatable front wheels and a pair of rotatable rear wheels arranged for steering said sailing apparatus, a triparite body having a forwardly extending portion and oppositely downwardly extending portions which are connected to the front wheels, said tripartite body further including a head which comprises a sleeve portion serving to support a mast for a sail, a seat positioned rearwardly of said mast, and steering means for said rear wheels arranged to be moved from an inoperative position so that a rider may enter or leave said seat to an operative position for steering said sailing apparatus when the rider is in the seat.

2. A wind propelled sail vehicle as claimed in claim 1, said rear wheels being mounted on a downwardly curved support bar.

3. A wind propelled sail vehicle as claimed in claim 1, in which said seat is supported on transversely extending members, the opposite ends of which are associated with a pair of spaced longerons which extend longitudinally of said frame.

4. A wind propelled sail vehicle as claimed in claim 1, in which said longerons include rearward portions that terminate in a transverse cross member that forms a support for the rear wheels.

5. A wind propelled sail vehicle as claimed in claim 1, in which said mast has a foot portion that is associated with a cross member.

6. A wind propelled sail vehicle as claimed in claim 1, in which said seat is longitudinally adjustable relative to said frame.

* * * * *